Oct. 25, 1955     R. K. POTTLE     2,721,683
MACHINE FOR COUNTING AND STACKING CAN ENDS
Filed June 3, 1954     9 Sheets-Sheet 1

Fig. 1

INVENTOR.
RALPH K. POTTLE
BY
ATTORNEYS

Oct. 25, 1955

R. K. POTTLE 2,721,683

MACHINE FOR COUNTING AND STACKING CAN ENDS

Filed June 3, 1954

INVENTOR.
RALPH K. POTTLE
BY Charles H. Brue
Leland R. McCann
George W. Reiber
ATTORNEYS Oct. 25, 1955      R. K. POTTLE      2,721,683
MACHINE FOR COUNTING AND STACKING CAN ENDS
Filed June 3, 1954      9 Sheets-Sheet 3

Fig. 3

INVENTOR.
RALPH K. POTTLE
BY Charles H. Erne
Leland R. McCann
George W. Reiber
ATTORNEYS Oct. 25, 1955  R. K. POTTLE  2,721,683
MACHINE FOR COUNTING AND STACKING CAN ENDS
Filed June 3, 1954  9 Sheets-Sheet 4

Fig. 4

INVENTOR.
RALPH K. POTTLE
BY Charles H. Ewe
Leland R. McCann
George W. Raber
ATTORNEYS Oct. 25, 1955   R. K. POTTLE   2,721,683
MACHINE FOR COUNTING AND STACKING CAN ENDS
Filed June 3, 1954   9 Sheets-Sheet 5

Fig. 5

INVENTOR.
RALPH K. POTTLE
BY Charles H. Lene
Leland R. McCann
George W. Reiber
ATTORNEYS Oct. 25, 1955 R. K. POTTLE 2,721,683
MACHINE FOR COUNTING AND STACKING CAN ENDS
Filed June 3, 1954 9 Sheets-Sheet 7

INVENTOR.
RALPH K. POTTLE
BY Charles H. Erne
Leland R. McCann
George W. Reiber
ATTORNEYS

Oct. 25, 1955    R. K. POTTLE    2,721,683
MACHINE FOR COUNTING AND STACKING CAN ENDS
Filed June 3, 1954    9 Sheets-Sheet 9

INVENTOR.
RALPH K. POTTLE
BY
ATTORNEYS

United States Patent Office 2,721,683
Patented Oct. 25, 1955

2,721,683

MACHINE FOR COUNTING AND STACKING CAN ENDS

Ralph K. Pottle, Georgetown, Conn., assignor to American Can Company, New York, N. Y., a corporation of New Jersey Application June 3, 1954, Serial No. 434,167

14 Claims. (Cl. 226—14)

The present invention relates to a machine for counting and stacking flat disc-shaped articles such as can ends and the like and has particular reference to improved high speed continuously operating devices for segregating batches of a predetermined counted number of articles and for assembling the batches in stacks for packaging for shipment and storage.

An object of the invention is the provision in a counting and stacking machine of devices which insure of an accurate and rapid count of the articles assembled in a stack and which assembles a plurality of such stacks in succeeding order, the stacks being located at a plurality of stations in the machine to afford time for the manual removal and packaging of one stack while another is being built up thereby providing for continuous high speed operation of the machine.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the instant invention the drawings disclose a machine for counting out and stacking batches A (Fig. 4) of a predetermined number of sheet metal circular can ends B having curled peripheral edges or flanges C (see Fig. 21) defining an annular channel preferably containing a lining or sealing compound.

Figure 1:
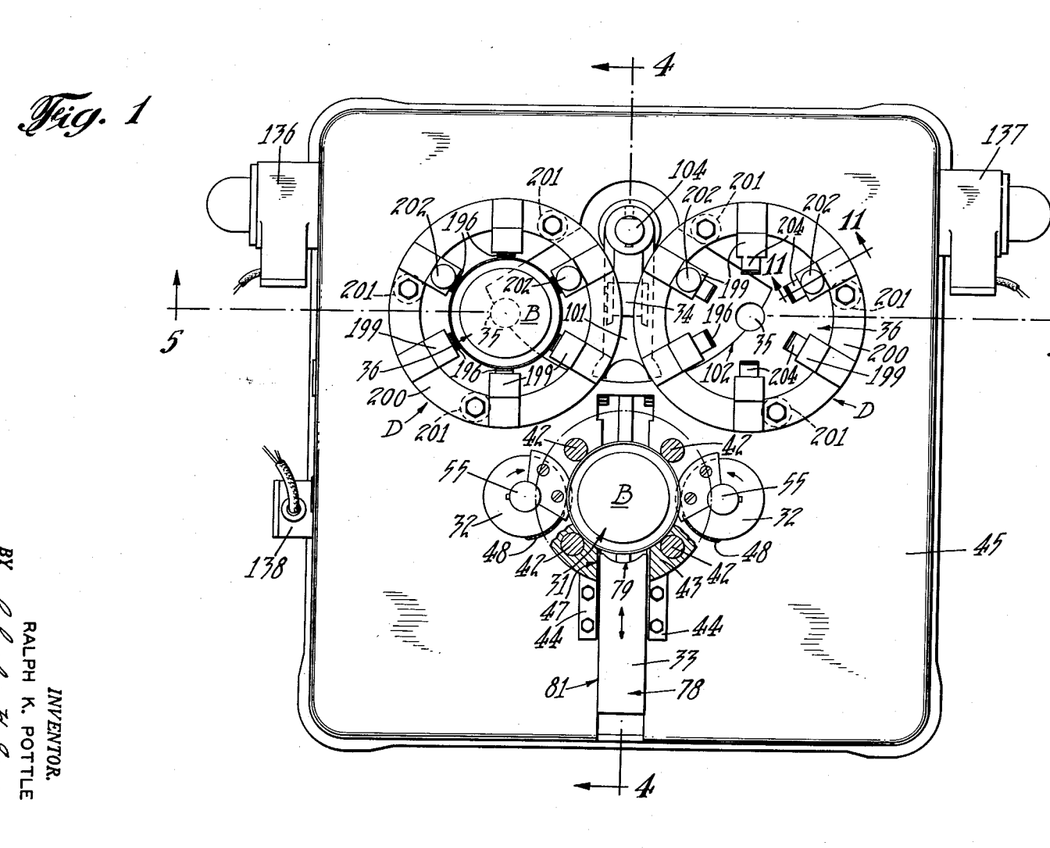
Figure 1 is a top plan view of a counting and stacking machine embodying the instant invention.
Figure 2:
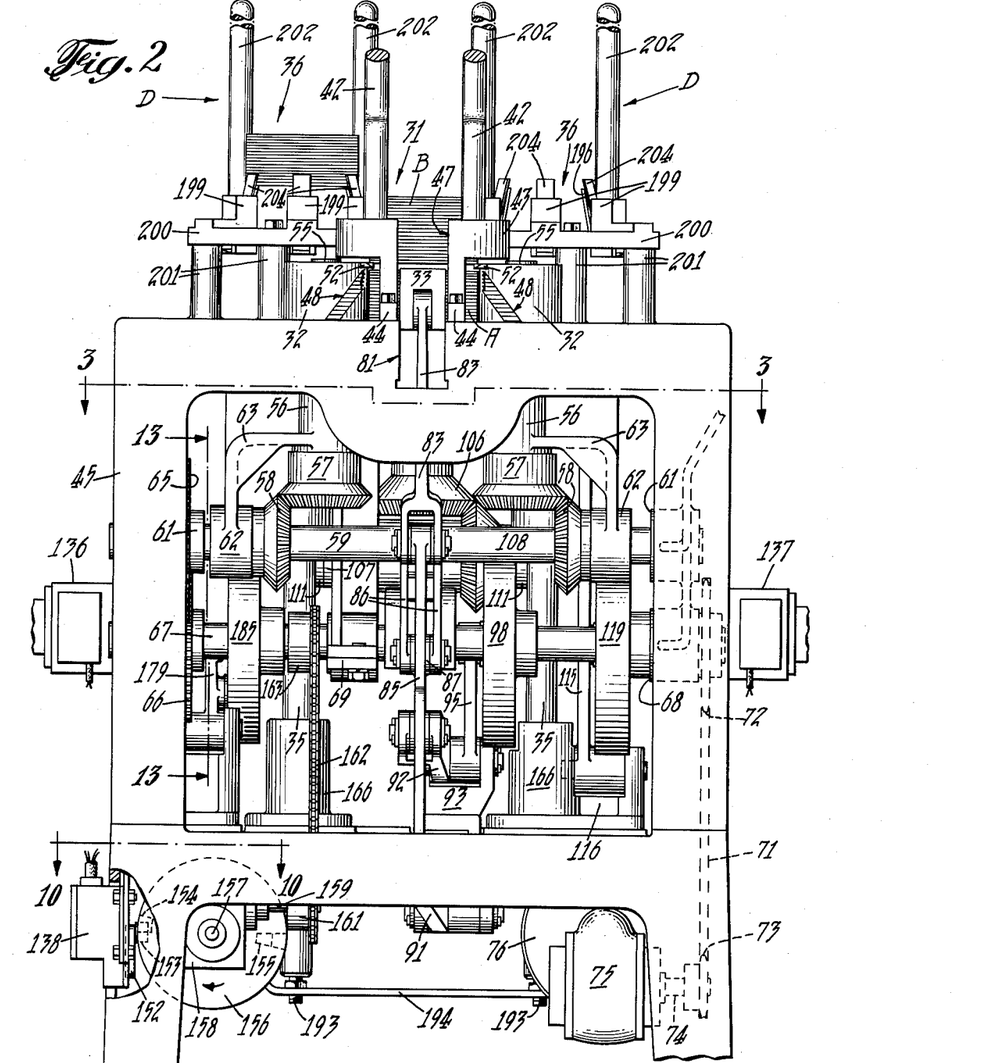
Fig. 2 is a front elevation of the machine shown in Fig. 1, parts being broken away.
Figure 19:
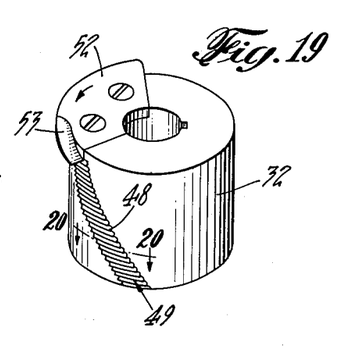
Fig. 19 is an enlarged perspective view of a separator screw used in the machine and shown in Figs. 15, 16, 17, 18.
Figure 20:
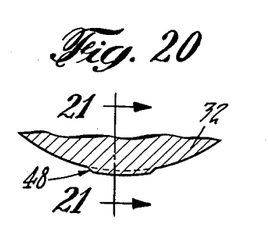
Fig. 20 is a fragmentary sectional view as taken substantially along a plane indicated by the line 20—20 in Fig. 19.

In the machine, the can ends B are received in a substantially continuous procession from any suitable source of supply such as a sealing compound drying machine. The received ends B fall into a stacked formation in a magazine 31 (Figs. 1 and 2). In order to provide for the continuous reception of the can ends B they enter the magazine 31 at its top end while the can ends B to be packaged are removed from the bottom of the magazine. The removal of the can ends B from the bottom of the magazine is effected in batches A (Fig. 4) of a predetermined number of ends, each batch preferably containing 25 can ends, the can ends being accurately and rapidly counted and segregated as a unit batch by a pair of cooperating counting and segregating screws or elements 32 (Figs. 1, 2 and 19) rotated in opposite directions adjacent the bottom of the magazine 31.

Figure 4:
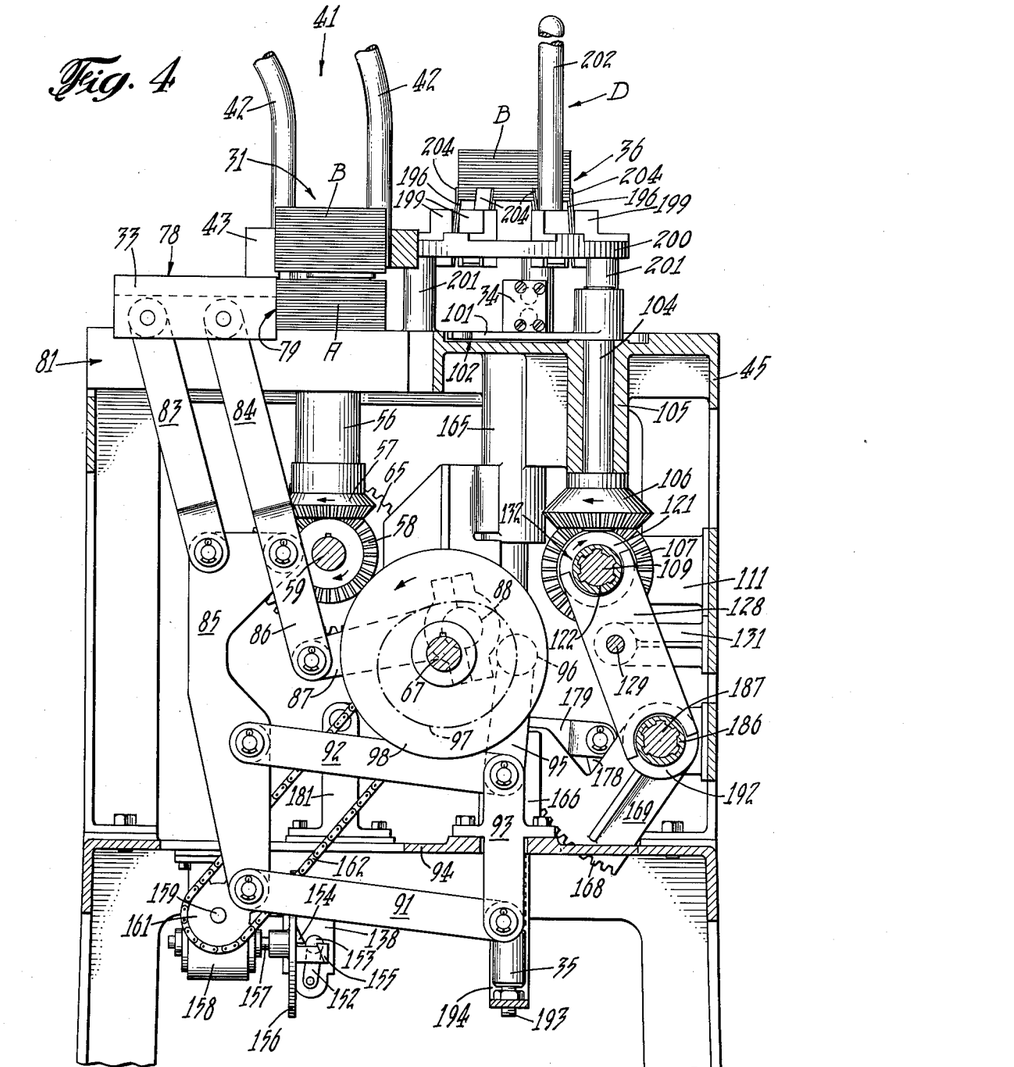
Figs. 4 and 5 are sectional views taken substantially along the lines 4—4, 5—5 respectively in Fig. 1, with parts broken away, Fig. 5 including a wiring diagram of the electrical apparatus used in the machine.
Figure 6:
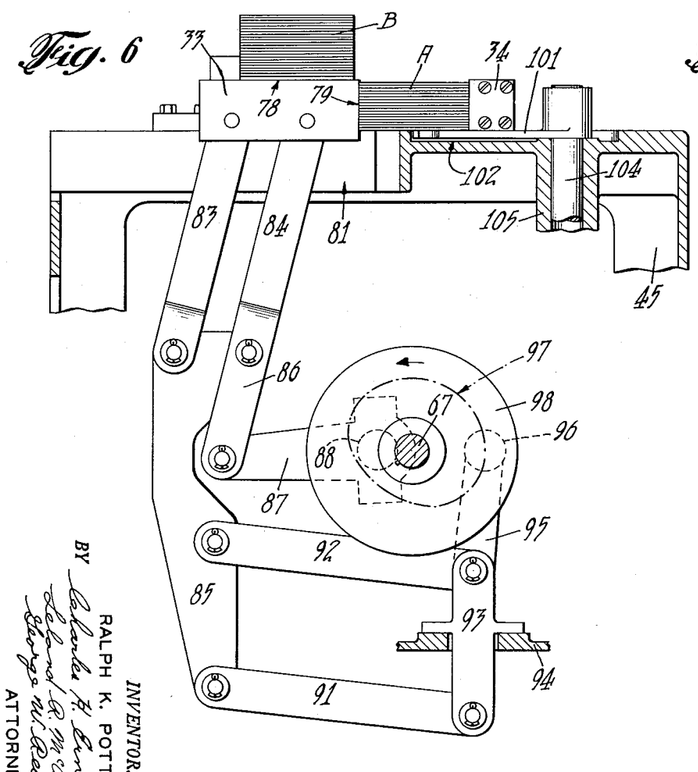
Figs. 6 and 7 are schematic sectional views similar to Fig. 4, and showing certain of the parts in Fig. 4 in different positions.
Figure 7:
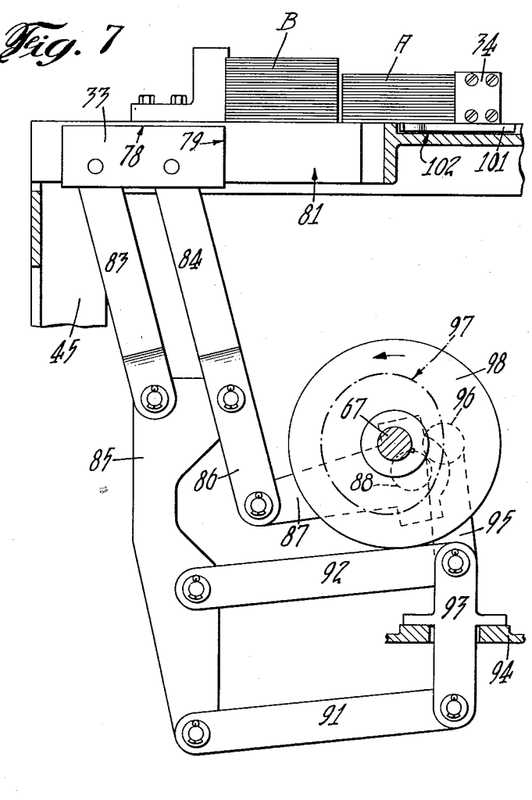
Figure 8:
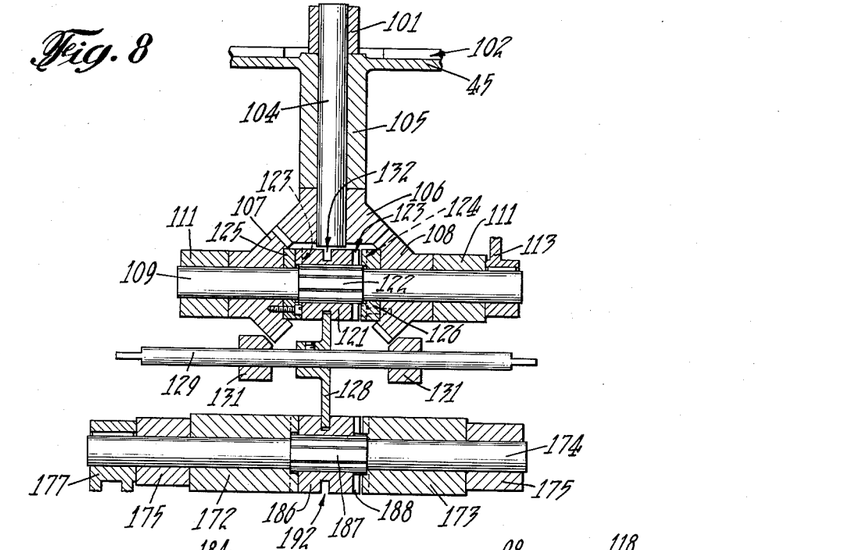
Figs. 8 and 9 are sectional views taken substantially along the respective lines 8—8, 9—9 in Fig. 3.
Figure 15:
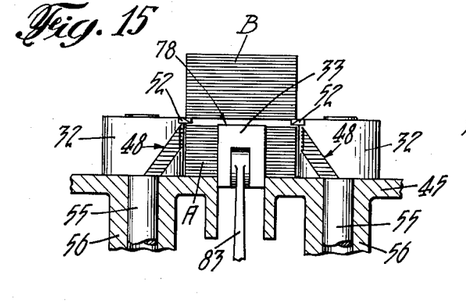
Figs. 15, 16, 17, 18 are schematic views illustrating certain of the parts shown in the upper portion of Fig. 2, the different views showing the movable parts in different positions, parts being broken away.

When a batch A of 25 can ends B is counted out by the screws 32, the screws segregate the batch from the remainder of the supply or feed stack and support the remaining stack on top of the screws as shown in Figs. 4 and 15. Immediately upon segregation of a batch A of can ends, a pusher member 33 (Figs. 1 and 4) moves into position under the supply stack and in so doing receives and supports the stack and also pushes the segregated batch A of counted can ends forward from between the counting screws 32, advancing the batch of counted ends to a position in engagement with a vertically disposed oscillatable holding magnet 34, as best shown in Fig. 6. While the magnet 34 holds the batch A of can ends in place, the pusher 33 moves vertically down to lower the supply stack to the bottom of the magazine 31 and then moves horizontally backward from under the supply stack as shown in Fig. 7, and vertically upward in front of the stack to its original position, as shown in Fig. 4 in readiness for a repeat cycle of operation.

Figure 5:
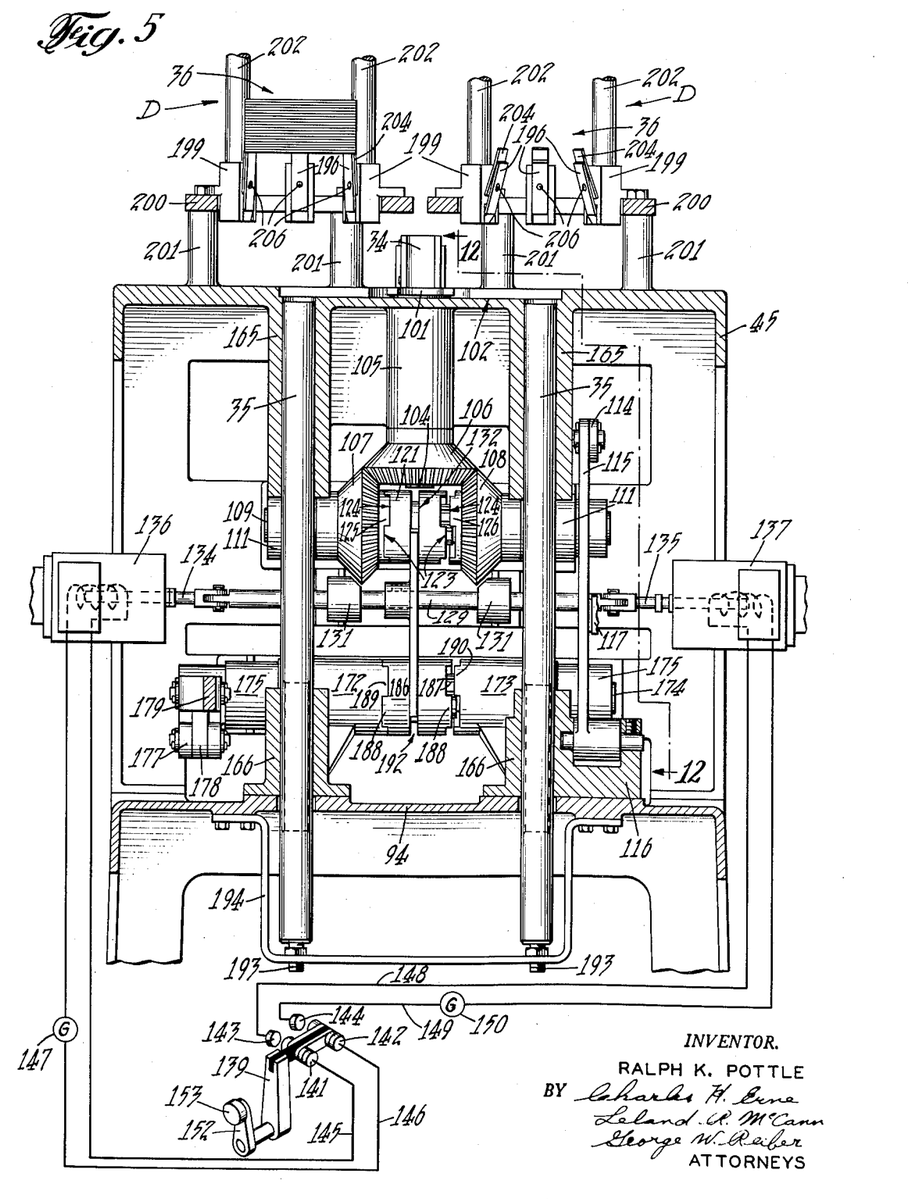

During this return movement of the pusher 33, the magnet 34 pivots horizontally to one side to swing the batch A of can ends into a stacking station D where the batch A is in vertical alignment above a lifter rod or member 35 (Figs. 1 and 5) and under a stationary stacking magazine 36. While the match A is in this position the lifter rod 35 moves up and lifts the batch A of 25 can ends into the magazine 36. The magnet 34 then pivots back to its original position to receive another batch. This operation is repeated a predetermined number of times, in the instant case 10 times to build up in the stacking magazine 36 a stack of 250 can ends.

There preferably are two stationary stacking stations D, located one on each side of the pivoted magnet 34 as shown in Fig. 1 and in operation the magnet 34 swings 10 times towards one station to build up a stack of can ends therein and then reverses its movement and swings 10 times in the opposite direction toward the other stacking station D to build up another stack at this second station. In this manner, a stack of can ends built up at one station can be removed and packaged while another stack is being formed at the other station. By thus alternating the use of the two stacking stations, the machine is kept in continuous operation and high speed stacking and packaging may be readily effected.

Reference will now be had to the drawings in detail.

The can ends B, to be counted and formed into stacks of a predetermined number of ends for packaging, enter the machine by way of a runway 41 (Fig. 4) defined by a plurality of spaced and parallel rods 42 arranged around the outer periphery of the can ends. The drawings show four of these rods 42 (see Fig. 1). These rods 42 lead from the source of supply of the can ends and may be curved or angularly disposed for this purpose. In the machine, the rods 42 terminate in straight vertical sections which constitute the supply magazine 31.

The terminal ends of the rods 42 are secured in a horizontally disposed support ring 43 preferably formed with a pair of spaced and parallel depending brackets 44 secured to the flat top of a frame 45 which constitutes the main frame of the machine. The brackets 44 preferably are spaced and parallel and extend from the machine front side of the ring 43 on opposite sides of a transverse clearance opening 47 in the ring to guide and clear the pusher 33 as will be more fully explained hereinafter. The can ends B in the supply stack normally rest on top of the frame 45, in front of the pusher 33, and extend well up into the magazine 31 and runway 41.

The counting and segregating screws or elements 32, which count out and segregate the batches A of 25 can ends from the supply stack of can ends in the magazine 31, are disposed on top of the frame 45 between the top of the frame and the bottom of the magazine rod support ring 43, as best shown in Figs. 1 and 2. There are two of these counting and segregating screws 32 and they are located on opposite sides of the magazine 31 in spaced relation so that a can end B will just pass between them.

Each screw 32 is cylindrical in shape and of a height equal to the height of a stack of 25 slightly separated or vertically spaced can ends B. The outer periphery of each screw 32 is formed with a steep or sharply inclined helical protuberance 48 (see Figs. 1, 2, 16, 19 and 20) which extends laterally beyond the outer periphery of the screw and which is formed with a plurality of vertically spaced, horizontal grooves 49 (see Fig. 21).

Figure 21:
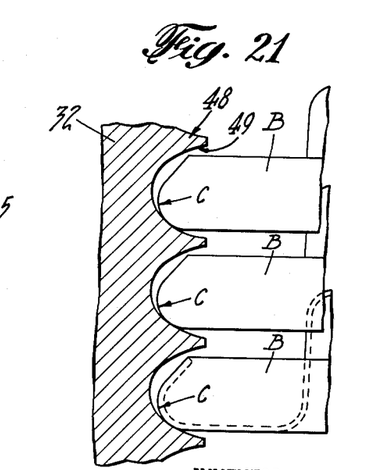
Fig. 21 is a greatly enlarged sectional view taken substantially along the line 21—21 in Fig. 20, and showing portions of stacked can ends in place.

In the instant case, each screw 32 is formed with 25 of these grooves 49 and they are vertically spaced apart a distance slightly greater than the thickness of the curved peripheral edges C of the can ends as best shown in Fig. 21 so that each groove will receive only one end edge C and retain it in slightly spaced relation to the next adjacent upper and lower can ends. The helical protuberances 48 on the two screws 32 are inclined in opposite directions and are disposed in timed relation so that as the screws rotate in unison and in opposite directions (as indicated by the arrows in Fig. 1), the two protuberances rotate simultaneously, from opposite sides, into engagement with the can ends B in the lower portion of the supply stack resting on top of the frame 45. The lower ends of the helical protuberances 48 are in the lead and hence engage the can ends first.

Figure 17:
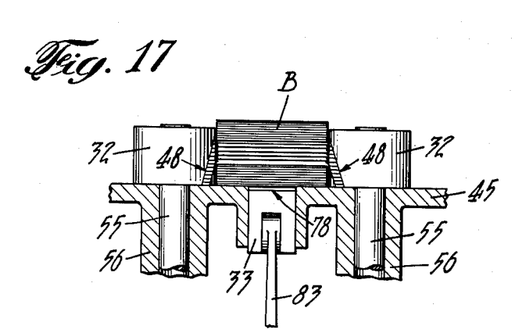
Figure 18:
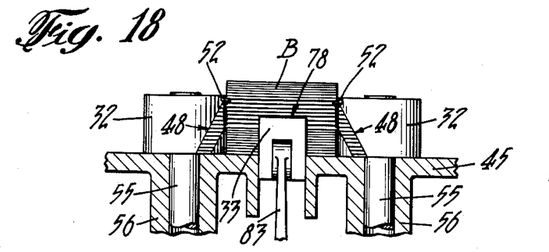

As the screws 32 rotate, the grooves 49 in the protuberances 48, starting with the lowermost groove of each screw, receives the peripheral edge C of one can end B and raises the entire supply stack slightly to separate the received can end from those next above to insure the reception of only one can end. In this manner and as the helical protuberances 48 progressively rotate past the supply stack, each groove 49 of each screw, starting from the bottom up, separates one can end from the stack and lets the separated can end fall to build up a batch A of segregated can ends (as shown in Figs. 17 and 18). When the last or uppermost groove 49 has separated its can end and has let it fall onto the batch A, 25 can ends have been counted out and separated to form a completed batch A of can ends located in front of the pusher 33.

As the last or 25th can end is counted out the entire supply stack above this 25th can end is raised slightly and is temporarily supported above the segregated can ends in the batch A to provide clearance for removal of the batch A as a unit. This elevation and support of the supply stack is effected by a segmental shelf 52 (Figs. 18 and 19) which projects laterally beyond the protuberance 48 of each screw 32 and which is secured in a recess in the top of each screw. The top faces of the shelves 52 preferably are flush with the tops of the screws. The leading edge of each shelf is formed with an inclined ledge 53 which leads from the upper edge of the uppermost groove 49 in the protuberance 48 and terminates at the upper face of the shelf so as to engage under the peripheral edge C of the 26th can end in the supply stack and thus raise the entire stack to the top of the shelves 52 of the two screws 32 as the screws rotate, to separate and support the stack above the batch A of counted and segregated can ends.

Figure 3:
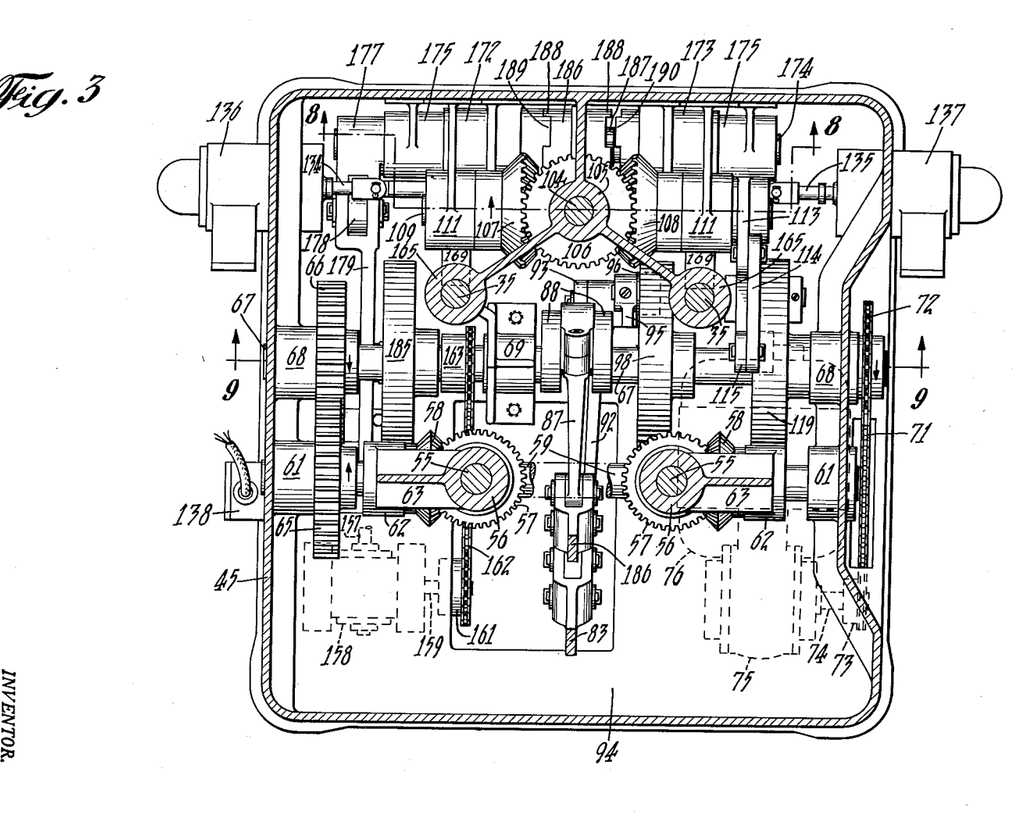
Fig. 3 is a horizontal section taken substantially along the broken line 3—3 in Fig. 2.
Figure 9:
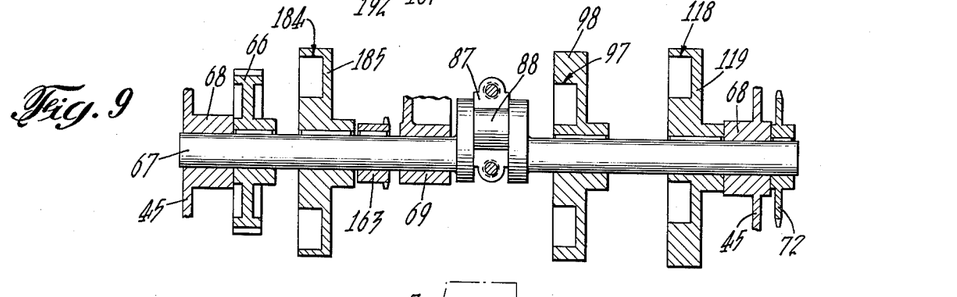

For the purpose of supporting and rotating the counting and segregating screws 32, the screws are mounted on the upper ends of a pair of spaced and parallel, vertically disposed shafts 55 (Figs. 1, 2, 3, 15, 16, 17, 18) journaled in bearings 56 which depend from the top of the main frame 45. The shafts 55 are continuously rotated in the proper direction by bevel gears 57 which are carried on the lower ends of the shafts. These bevel gears 57 mesh with and are driven by bevel gears 58 secured to and rotating with a cross-shaft 59 having its ends journaled in bearings 61 formed in the leg portions of the frame 45 and in supplemental bearings 62 formed in brackets 63 connected with the vertical shaft bearings 56. The cross-shaft 59 is rotated continuously by a spur gear 65 (Fig. 3) which is carried on the shaft and which meshes with and is driven by a spur gear 66 secured to a main drive shaft 67. The main drive shaft 67 is journaled in bearings 68 formed in the leg portions of the frame 45 and in a supplemental bearing bracket 69 (see also Fig. 9) which depends from the top of the frame. The main drive shaft 67 preferably is driven by an endless chain 71 (Figs. 2 and 3) which operates over a driven sprocket 72 on the shaft (see also Fig. 9) and which also operates over a driving sprocket 73 on a shaft 74 of a conventional gear reduction unit 75 operated by an electric motor 76 mounted in the frame 45.

As hereinbefore mentioned, the segregated unit batch A of can ends located between the counting screws 32 in front of the pusher 33 is pushed forward by the pusher into engagement with the magnet 34, while the supply stack is held in its slightly elevated position on the support shelves 52 on the screws. The pusher 33 preferably is a horizontally disposed rectangular block or member having a horizontal flat top supporting face 78 (Fig. 4) and a vertical, transversely and concavely curved front pusher face 79. This pusher block 33 is movable vertically and horizontally in a slot guideway 81 formed in the top of the frame 45 between the two brackets 44 of the magazine bar support ring 43.

The pusher block 33 is moved in its guideway 81 by a system of parallelogram links and a combined cam and crank motion which moves the pusher block along a parallelogram path of travel. For this purpose the pusher block 33 is pivotally mounted on the upper ends of a pair of spaced and parallel upright links 83, 84 (Fig. 4) of the same length and pivotally secured at their lower ends to a vertically disposed plate 85. The link 84 is formed with an integral pair of depending arms 86 (see Fig. 2) which are pivotally connected to one end of a pitman 87 carried on a crank 88 (see also Figs. 3 and 9) on the main drive shaft 67.

The plate 85 is supported on a pair of spaced and parallel horizontal links 91, 92 (Fig. 4) which at one end are pivotally connected to the plate. The opposite ends of the links 91, 92 are pivotally connected to a bracket 93 secured to and extending through a horizontal web section 94 of the frame 45. The link 92 is formed with an integral upright cam arm 95 which at its upper end carries a cam roller 96 which operates in a cam groove 97

(Figs. 4 and 9) of a face cam 98 secured to and rotating with the main drive shaft 67.

Hence as the main drive shaft 67 rotates through a cycle of operation, the cam groove 97 rocks the cam arm 95 and through the parallelogram links 91, 92 raises and lowers the plate 85 and the pusher block 33 carried thereon, in time with the other moving parts of the machine. At the same time, the crank 88 rocks the arm 86 and thus through the parallelogram links 83, 84 reciprocates the pusher block 33 horizontally in time with the other moving parts of the machine. The result of this combination of movements is that the pusher block 33 first moves horizontally from the position shown in Fig. 4 to the position shown in Fig. 6. During this movement the pusher block 33 pushes the segregated batch A of counted can ends B from the position under the magazine 31 as shown in Fig. 4 to a position in contact with the magnet 34 as shown in Fig. 6. In doing this the pusher block 33 moves into a position under the supply stack of can ends with its top supporting face 78 closely adjacent the lowermost can end in the supply stack, the stack still being supported on the segmental shelves 52 of the counting screws 32 as shown in Fig. 15.

Figure 16:
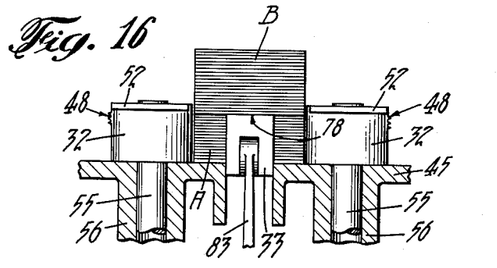

While the pusher block 33 is in this forwardly advanced position as shown in Fig. 6, the segmental shelves 52 of the counting screws 32 rotate from under the supply stack and thus permit the stack to fall through the slight space between it and the pusher block top face 78 so that the stack is fully supported on the face 78 as shown in Figs. 6 and 16. As soon as the support of the supply stack is transferred to the pusher block 33, the block, through the above described parallelogram link system, moves straight down to gently lower the supply stack to the top of the frame 45 to transfer the support of the stack to the frame top and to thus locate the lowermost can ends in the supply stack for another counting operation to produce a new batch A. The pusher block 33, after leaving the supply stack supported on the frame top continues to move down to a level slightly below the frame top as shown in Fig. 7 to clear the stack and then moves straight back horizontally (toward the left) to the position shown in Fig. 7 and before stopping, rises vertically to its original position in back of the supply stack in readiness for the next pusher operation as shown in Fig. 4.

During this return movement of the pusher block 33 to its starting position, the batch A of counted can ends held by the magnet 34 is swung to one side (toward the left as viewed in Fig. 1) into a position at the left hand stacking station D (Fig. 1). The magnet 34 preferably is a permanent magnet although an electromagnet may be utilized if desired. To facilitate swinging of the batch A of counted can ends B into the stacking station, the magnet 34 is secured to the top face of a horizontally disposed oscillatable support arm 101 (Figs. 1, 4, 5 and 12) and is located intermediate its ends so that a batch A of can ends held by the magnet is partially supported on the arm 101 as shown in Figs. 6 and 7. The support arm 101 operates in a shallow sector shaped recess 102 in the top of the frame 45 with the top face of the arm substantially flush with the top of the frame.

As hereinbefore mentioned, the magnet 34 attached to the support arm 101 is arranged to swing in opposite directions on either side of the magazine 31, toward each of the stationary stacking stations D for building up stacks of a predetermined number, for example 250 can ends in each stack. These stacks preferably are built up successively, not simultaneously. To build up these stacks, the support arm 101 is repeatedly swung toward one stacking station D, for example the station on the left in Fig. 1 as mentioned above, until the stack at this station is built up in ten swinging motions of the magnet and then its movement is reversed to repeatedly swing toward the right in Fig. 1 to build up another stack at the second stacking station D. Since each batch A contains 25 can ends the support arm 101 swings toward a stacking station D ten times in succession to build up a stack of 250 can ends at that station.

In order to effect this repeated swinging action of the support arm 101 in opposite directions, the outer end of the arm is secured to a vertically disposed pivot shaft 104 carried in a long bearing 105 depending from the top of the machine frame 45 (see Figs. 3, 4, 5, 8 and 12). At its lower end the rocker shaft 104 carries a bevel gear 106 which is secured to the shaft and which meshes with two oppositely disposed driving bevel gears 107, 108 loosely mounted on a short clutch shaft 109 carried in a pair of bearing brackets 111 projecting from the frame 45.

The clutch shaft 109 is rocked in opposite directions continuously in time with the other moving parts of the machine by a rocker arm 113 (Figs. 3 and 12) which at one end is keyed to the outer end of the shaft. The opposite end of the rocker arm 113 is pivotally connected by a link 114 to the upper end of an upright cam lever 115 pivotally mounted at its lower end in a bearing block 116 (see also Figs. 2 and 5) secured to the horizontal web section 94 of the frame 45. Intermediate its ends, the cam lever 115 carries a cam roller 117 which operates in a cam groove 118 (Figs. 9 and 12) of a face cam 119 keyed to the main drive shaft 67. The cam groove 118 is shaped to rock the clutch shaft 109 backward and forward, or vice versa, once for each revolution of the drive shaft 67.

The rocking of the clutch shaft 109 effects the swinging of the support arm 101 in the proper direction, through a movable jaw clutch member or barrel 121 (Figs. 4, 5 and 8) which is slidably mounted on a splined section 122 of the clutch shaft 109 for rotation therewith. The clutch barrel 121 is located between the two driving bevel gears 107, 108 mounted on the clutch shaft 109 and at its opposite ends is formed with clutch teeth 123 arranged to engage or mesh with similar clutch teeth 124 formed in clutch plates 125, 126 which surround the clutch shaft 109 and which are secured to the inner end faces of the bevel gears 107, 108.

The clutch barrel 121 in length is shorter than the distance between the clutch plates 125, 126, so that the barrel can be shifted longitudinally of the clutch shaft on the splined section 122, to engage one or the other of the clutch plates 125, 126 and through this engagement drive one or the other of the bevel gears 107, 108 to rock the bevel gear 106, pivot shaft 104 and the support arm 101 in the proper direction. This longitudinal shifting of the clutch barrel 121 is brought about by a vertically disposed shifting plate 128 (Figs. 4, 5 and 8) carried on a horizontal rod 129 disposed in parallelism with the clutch shaft 109 and slideably disposed in a pair of spaced bearing brackets 131 projecting from the machine frame 45. The upper end of the plate 128 operates in a narrow annular groove 132 formed in the outer peripheral face of the clutch barrel 121 and is bifurcated to partially surround the clutch shaft 109 and thus shift the clutch barrel 121 when the shifting plate 18 is moved laterally.

The lateral movement of the shifting plate 128 is effected by an endwise movement of the rod 129. For this purpose, the outer ends of the rod 129 are connected respectively to movable cores 134, 135 (Figs. 3 and 5) of a pair of electric solenoids 136, 137 which are disposed on opposite sides of the machine and which are secured to the machine frame 45. The solenoids 136, 137 are arranged for independent, successive energization through a double pole electric switch 138 (Figs. 1, 2, 3 and 10) having a movable element 139 (Fig. 5) which can be shifted into engagement with one or the other of two pairs of electric contacts 141, 142 and 143, 144. The contacts 141, 142 are connected by wires 145, 146 to the solenoid 136 and to a source of electric current such as a generator 147, to form an electric circuit through the solenoid and normally open at the contacts. In a similar manner the contacts 143, 144 are connected by wires 148, 149 to the solenoid 137 and to a source of electric current such as a generator 150, to form an electric circuit through the solenoid and normally open at the contacts.

The movable switch elements 139 of the switch 138 is rocked back and forth between the sets of contacts 141, 142 and 143, 144 by cam action and in time with the transfer of the stacking operation from one station D to the other. For this purpose the movable switch element 139 is rocked by a cam lever 152 (Figs. 2, 4, 5 and 10) which carries a cam roller 153 which is disposed in the circular path of travel of a short cam lug 154 (Fig. 10) and a diametrically disposed long cam lug 155 formed on a rotatable disc 156 located adjacent the switch 138. The disc 156 is mounted on a shaft 157 of a conventional gear reduction unit 158 (Figs. 2, 3 and 4) secured to the horizontal web section 94 of the machine frame 45. The gear reduction unit 158 is driven by a shaft 159 which extends into the unit and which on its outer end carries a sprocket 161 continuously rotated by an endless chain 162 which operates over a driving sprocket 163 keyed to the main drive shaft 67 (see also Fig. 9.)

The speed of the disc shaft 157 to the main shaft 67 is in the ratio of 1 to 20 so that the disc 156 makes only one revolution while the main shaft 67 revolves 20 times. Hence each time the main shaft 67 makes one revolution, one batch A of 25 can ends is removed from the magazine 31 and transferred to one of the stacking stations D and upon the completion of 10 revolutions of the main shaft, 10 batches A or 250 can ends sufficient to produce one stack at a station D has been transferred into the station. During this transfer of 10 batches A of can ends the cam disc 156 makes one half a revolution and at the transfer of the 10th batch A one or the other of the cam lugs 154, 155 engages the cam roller 153 and pushes it in the proper direction to rock the cam lever 152 and movable switch element 139 to shift the element out of engagement with one set of contacts and into engagement with the other set.

In the drawings (Fig. 5) the movable switch element 139 is shown in engagement with the contacts 141, 142, having been pushed into this engagement by the long cam lug 155. In this position, the switch element 139 closes the electric circuit through the solenoid 136 and thus energizes this solenoid with the result that the movable core 134 of the solenoid is drawn into the solenoid and thus shifts the rod 129 and shifting plate 128 (toward the left as viewed in Fig. 5) into the position shown in Fig. 5. In this position of the shifting plate 128, the clutch barrel 121 is engaged with the clutch plate 125 on the bevel gear 107 and thus causes the bevel gear 107 to rock the bevel gear 106 and the support arm 101 toward the left as viewed in Fig. 5 to transfer the batches A of can ends into the stacking station D shown at the left of Fig. 5.

Figure 10:
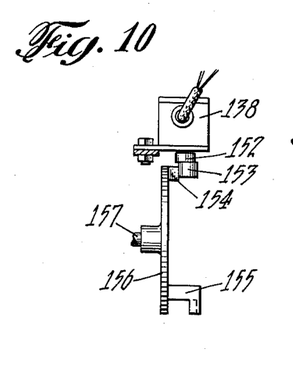
Fig. 10 is a top plan view of certain parts of the machine, the view being taken along a plane indicated by the line 10—10 in Fig. 2.

Upon the transfer of 10 batches A of can ends into this station D, the disc 156 rotates the short cam lug 154 into engagement with the cam roller 153 as shown in Fig. 10 with the result that the cam lever 152 and movable switch element 139 will be rocked toward the right as viewed in Fig. 10. Rocking of the switch element in this direction shifts it away from the contacts 141, 142 and into engagement with the contacts 143, 144. This action breaks the circuit connecting with the solenoid 136, deenergizing this solenoid and establishing the circuit connecting with the solenoid 137 to energize this solenoid 137 and thereby draw the rod 129 toward the right as viewed in Fig. 5.

This movement of the shift rod 129 shifts the clutch barrel 121 out of driving engagement with the bevel gear 107 and into driving engagement with the bevel gear 108. This gear 108 thus rocks the bevel gear 106 in the opposite direction 10 times to swing the support arm 101 toward the right as viewed in Fig. 5 to transfer 10 batches A of can ends into the station D at the right in Fig. 5. Thus the continuously rotating disc 156 shifts the switch element 139 alternately in opposite directions to shift the clutch barrel 121 after the transfer of every 10th batch A of can ends removed from the magazine 31 to build up separate stacks successively in each of the two stacking stations D.

When the batch A of 25 can ends is received at a stacking station D it is immediately lifted into the magazine 36 associated with that station. The lifting of each batch A of can ends is effected by the lifter rod 35 associated with each station. These lifter rods 35 are vertically and slideably disposed in upper and lower spaced bearings 165, 166 (Figs. 3, 5 and 13) respectively depending from the top of the machine frame 45 and extending up from the horizontal web 94 of the frame. The lower ends of the lifter rods 35 are formed with rack teeth 167 (Fig. 13) which mesh with similar teeth 168 on a vertically disposed segment gear 169 which extends through an opening 171 (see also Fig. 14) in the side of the lower bearings 166. There are two segment gears 169, one for each of the lifter rods 35, and they are formed on hubs 172, 173 loosely mounted on a horizontal rocker shaft 174 (see also Fig. 8) carried in a pair of spaced bearing blocks 175 projecting from the side of the machine frame 45.

The lifter rod rocker shaft 174 is rocked back and forth for each batch A of 25 can ends, in time with the other moving parts of the machine, by a rocker arm 177 (Figs. 3, 8, 13 and 14) which is keyed to the outer end of the shaft 174. The rocker arm 177 is pivotally connected by a link 178 to one end of a cam lever 179 which at its opposite end is pivotally connected to a bracket 181 secured to the horizontal web 94 of the machine frame 45. Intermediate its ends, the cam lever 179 carries a cam roller 183 (Fig. 13) which operates in a cam groove 184 of a face cam 185 keyed to the main drive shaft 67 (see also Fig. 9).

The main drive shaft 67 continuously rotates the cam 185 and thus effects continuous rocking of the lifter rod rocker shaft 174. However only one or the other of the segment gears 169 loosely mounted on the rocker shaft 174 is rocked to operate only that lifter rod 35 which is associated with the stacking station D which is receiving the batches A of can ends B. For this purpose the rocker shaft 174 carries a clutch barrel 186 (Figs. 3, 4, 5, 8 and 14) which is similar to the support arm clutch barrel 121 and which is slideably carried on a splined section 187 of the rocker shaft 174 located between the hubs 172, 173 of the segment gears 169. The ends of the clutch barrel 186 are formed with clutch teeth 188, the teeth at one end being engageable with similar teeth 189 in the gear hub 172 and the teeth in the other end being engageable with teeth 190 in the gear hub 173. However the clutch barrel 186 is engageable with only one or the other of the gear hubs 172, 173 at a time, since the clutch barrel is slideable endwise along its splined section 187 between the hubs.

Sliding movement of the clutch barrel 186 is effected in time with and in the same direction of movement as the clutch barrel 121 which swings the support arm 101. To effect this synchronous movement, the clutch barrel 186 is connected to the shifting plate 128, the clutch barrel being provided with an annuar groove 192 in which a bifurcated lower end of the shifting plate 128 operates.

Hence when a stack of 250 can ends is built up at one stacking station D, and the clutch barrel 121 shifts to swing the support arm 101 and its magnet 34 in an opposite direction toward the other stacking station D, the lower clutch barrel 186 shifts with the upper clutch barrel 121 and thus stops operation of the one lifter rod 35 and starts operation of the other. At the idle station D, the segment gear and its hub remains stationary since they are disconnected from the rocker shaft 174. During this idle period the lifter rod 35 is supported at its lower end by a set screw 193 (Fig. 5) which is threadedly secured in a U-shaped strap iron bracket 194 which is secured to and depends from the horizontal web 94 of the frame 45. The bracket 194 extends under both lifter rods 35.

When a lifter rod 35 is in operation it moves up and down, through action of the cam 185 as above mentioned, in time with the swinging of a batch A of can ends into position above the lifter rod. As soon as the batch of can ends is in place, the lifter rod 35 moves up and lifts the batch of ends, stripping them from the magnet 34, and raising them into the stacking magazine 36 located above the lifter rod. The batch of can ends elevated into the magazine 36 is retained in position by a plurality of holding fingers 196 while the lifter rod 35 moves down through a return stroke to its original position in readiness to lift the next following batch up into the magazine, under the first batch.

The holding fingers 196 (Figs. 1, 4, 5 and 11) preferably are made of thin sheet metal to occupy a minimum space and are arranged in a slight angularly disposed upright position encircling the path of travel of the batches A of can ends being elevated into the magazines 36. At their lower ends, the fingers 196 are formed with cubical shaped bases 197 (Fig. 11) which are disposed in recesses 198 provided in cages 199 formed on the top face of and extending down into a support ring 200 located above the lifter rod 35 in concentricity therewith. The support ring 200 is mounted in a horizontal position on a plurality of bosses 201 which extend up from the top of the machine frame 45. There is one of these support rings 200 for each stacking station D. Two of the cages 199 of each of the rings 200 carry a pair of vertically disposed guide rods 202 to facilitate holding the stack of can ends in place.

Figure 11:
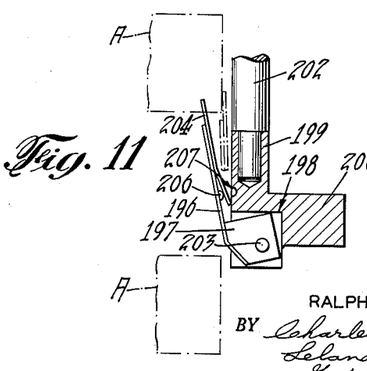
Fig. 11 is an enlarged sectional detail as taken substantially along the line 11—11 in Fig. 1.
Figures 12, 13, 14:
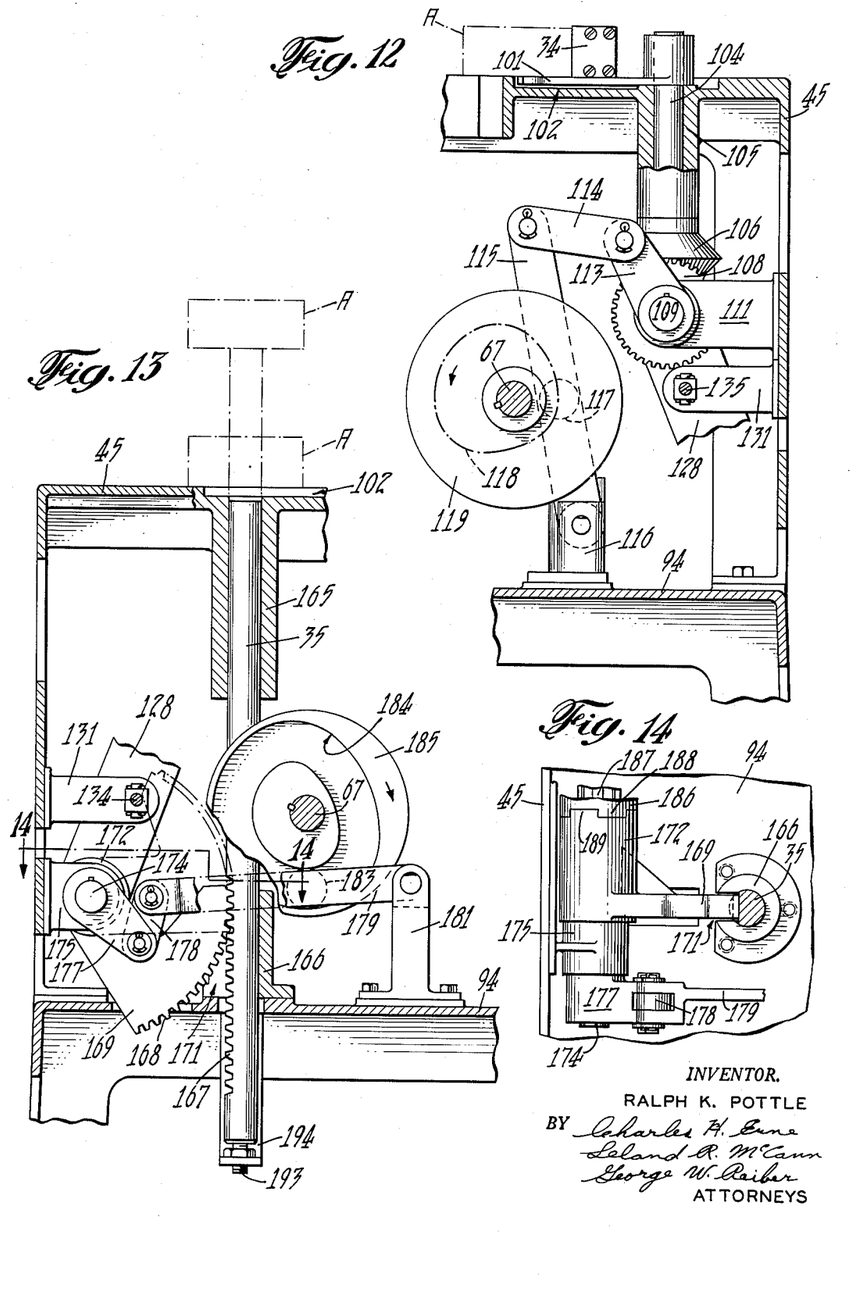
Fig. 12 is a sectional view taken substantially along the broken line 12—12 in Fig. 5, with parts broken away.
Fig. 13 is a sectional view taken substantially along the line 13—13 in Fig. 2, with parts broken away.
Fig. 14 is a sectional view taken substantially along the broken line 14—14 in Fig. 13, with parts broken away.

Each of the cubical bases 197 of the holding fingers 196 is mounted on a pivot pin 203 secured in its cage 199 in such a manner, as shown in Fig. 11, that the rear top edge of the base engages against the cage within its recess 198 to limit the inward travel of the fingers. The fingers 196 are yieldably retained in this position by flat springs 204 which are secured to the fingers and which press against the inner face of the cage 199.

Hence as each batch A of can ends is lifted upwardly by the lifter rod 35, it engages against and spreads the circle of holding fingers 196 outwardly to permit the can ends to pass. Upon passing the fingers, the latter snap back to their original positions under the batch of elevated can ends and thus hold the can ends suspended so that the lifter rod 35 can move down empty through its return stroke. As each batch A of can ends is added to the bottom of the stack, the other ends in the stack are pushed upwardly until a stack of 250 can ends is built up as hereinbefore mentioned.

Upon completion of this stack at one of the stacking stations D and while another stack is being built up at the other stacking station D, a fibre sleeve, carton, or bag is slipped manually over the top of the finished stack of 250 can ends in the magazine 36 and the entire stack removed so that the sleeve may be closed and sealed to complete the package.

If desired the sleeve or carton may be inserted into the magazine 36 first, to receive the batches A of can ends as they are elevated into the magazine so that when the stack is complete, the sleeve will be filled and immediately ready to remove the complete stack of ends for sealing. In order to hold the sleeve in place while the batches A of can ends are being elevated into it, the fingers 196 are formed with small buttons or projections 206 (Fig. 11) which are in alignment with clearance holes in the lower ends of the springs 204 and which are opposite cooperating depressions 207 in the cages 199. The lower end of the sleeve or carton when inserted in the magazine 36 extends down opposite the depressions 207 so that when the fingers 196 move toward the cages 199 as during elevation of a batch of can ends, the buttons 206 on the fingers extend through the clearance holes in the spring and press the sleeve into the depressions 207 to hold the sleeve in place. After the elevation of the batch of can ends into the magazine, when the fingers 196 move toward the center of the ring 200, the springs 204 serve as strippers to strip the sleeve off the buttons 206 so that the filled sleeve may be readily removed from the magazine without tearing the lower end of the sleeve.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for counting and stacking flat articles, the combination of a pair of laterally spaced stationary stacking devices for building into stacks for packaging a predetermined number of individual batches of a predetermined number of articles, transfer means movable toward and away from both of said stacking devices for conveying the individual batches of articles to said stacking devices, and actuating means including a direction changing device for said transfer means, said actuating means moving said transfer means repeatedly toward one of said stacking devices for conveying a predetermined number of batches of articles thereto and for then changing the direction of said transfer means for moving said means repeatedly toward the other of said stacking devices for conveying another predetermined number of batches of articles to said other stacking device to build up a stack of articles in each of said stacking devices in succession so that the built up stack in one device can be removed and packaged while the stack in the other device is being built up.

2. A machine of the character defined in claim 1 in which said transfer means is an oscillatable arm disposed between said stacking devices and mounted on a pivot shaft controlled by said actuating means.

3. A machine of the character defined in claim 1 in which said transfer means includes a magnetic device movable with said transfer means for retaining the articles of each batch in place during transfer of said articles to said stacking devices.

4. A machine of the character defined in claim 1 in which said transfer means is disposed in a table which supports said stacking devices and across which said transfer means conveys the batches of articles to said stacking devices.

5. A machine of the character defined in claim 1 in which said stacking devices each comprise a magazine ring member, a lifter element disposed below said ring member in vertical alignment therewith, means for raising and lowering said lifter element in time with said transfer means for elevating into said magazine ring member the batches of articles conveyed into position by said transfer means, and a plurality of yieldable support fingers disposed and circumferentially spaced within said ring member and projecting into the path of travel of the articles lifted into said ring member for supporting said articles in stacked relation to receive a container manually placed over said stacked articles for packaging them.

6. A machine of the character defined in claim 1 in which said stacking devices include means for holding a container in place in each of said devices for the reception of said articles as they are built up in stacked formation.

7. A machine of the character defined in claim 1 in which said stacking devices each comprise a magazine ring member, a lifter element disposed below said ring member in vertical alignment therewith, means for raising and lowering said lifter element in time with said transfer means for elevating into said magazine ring member the batches of articles conveyed into position by said transfer means, a plurality of cages disposed and circumferentially spaced within said ring member, a support finger pivotally mounted in each of said cages, and a flat spring element disposed between each finger and its cage for projecting said fingers into the path of travel of the articles lifted into said ring member for supporting said articles in stacked relation therein, said fingers having locking projections extending toward said cages and said cages having cooperating recesses for receiving said projections for locking a container in place on said ring member to receive the articles as they are built up in stacked formation, said springs having openings therein through which said projections extend to facilitate action of said springs as strippers in releasing said container from said projections to remove the filled container from said ring member.

8. A machine of the character defined in claim 1 in which each of said stacking devices includes a stack holder and an aligned lifter element and in which said actuating means includes devices for activating said lifter elements independently of each other and only one at a time in synchronism with the operation of said transfer means so that the lifter element of only the stacking device being served by said transfer means will operate while the other lifter element remains stationary.

9. A machine of the character defined in claim 1 in which said transfer means is an oscillatable arm mounted on a pivot shaft, and which said actuating means includes a rocker shaft carrying a pair of loosely rotatable spaced apart bevel gears meshing with a bevel gear secured to said pivot shaft and a clutch member mounted on and movable along said rocker shaft between said loose bevel gears and engageable with said gears independently of each other for driving the engaged gear, means for continuously rocking said rocker shaft, and means connected with said clutch member and operable in time with the building up of said stacks and at the completion of a stack to shift said clutch member into engagement with the proper bevel gear to drive and change the direction of said transfer means.

10. A machine of the character defined in claim 1 in which each of said stacking devices includes a stack holder and an aligned vertically reciprocable lifter element, a rack gear on each of said lifter elements, a segment gear for each of said rack gears, a rocker shaft on which said segment gears are loosely mounted, means for rocking said rocker shaft in time with said transfer means, a clutch member mounted on and slideable along said rocker shaft between said segment gears and engageable with said gears independently of each other for driving the engaged gear, and means connected with said clutch member and operable in time with the building up of said stacks and at the completion of a stack to shift said clutch member into engagement with the proper gear in time with the change in direction of said transfer means to activate only the lifter element associated with the stacking device being served by said transfer means.

11. A machine fo the character defined in claim 1 and including counting and segregating means for providing a batch of a predetermined number of articles in stacked relation and feeding means for advancing said batch of articles into position for transfer by said transfer means.

12. A machine of the character defined in claim 1 and including a vertical runway setting off a magazine for holding a supply of articles in stacked relation, means adjacent said magazine for segregating a batch of a predetermined number of articles from said magazine, a feeding device including a pusher element disposed in alignment with said transfer means, and actuating means operable in time with said transfer means for pushing said batch of articles into position adjacent said transfer means for advancement into a said stacking device.

13. A machine of the character defined in claim 1 and including a vertical runway setting off a magazine for holding a supply of articles in stacked relation, means adjacent said magazine for segregating a batch of a predetermined number of articles from said magazine, a feeding device including a pusher element disposed in alignment with said transfer means and said magazine, a parallelogram link mounting for said pusher element, and actuating means for said mounting, said actuating means being operable in time with said transfer means to move said pusher element under said magazine to receive and support the stack of articles in said magazine and to simultaneously advance said segregated batch of articles into position adjacent said transfer means for advancement into a said stacking device, said actuating means continuing movement of said pusher element along a parallelogram path of travel to lower said stack of articles in said magazine to batch segregating position and to move backwardly from under said stack and upwardly in front of said stack to its original position for a repeat feeding operation.

14. A machine of the character defined in claim 1 and including a vertical runway setting off a magazine for holding a supply of articles in stacked relation, a pair of rotatable, cooperating counting and segregating screws disposed below said magazine on opposite sides thereof for the passage of the supply stack of articles therebetween, a support adjacent the lower ends of said screws for supporting the supply stack of articles, means for rotating said screws in unison and in opposite directions, an inclined row of horizontal projections on each of said screws, said projections setting off between them a series of horizontal grooves corresponding in number to the number of articles in a unit batch of articles, said projections cutting in between individual articles in the supply stack between said screws during rotation of said screws for slightly separating said articles from each other and for counting the articles to constitute a unit batch, a separator shelf on each screw at the top end of each inclined row of projections to segregate the counted batch of articles from the articles remaining in the supply stack above said screws to segregate said unit batch of articles from said stack, and means for feeding said segregated batch of articles to said transfer means for transfer to a said stacking device.

No references cited.